US008745513B2

(12) United States Patent
Crystal

(10) Patent No.: US 8,745,513 B2
(45) Date of Patent: Jun. 3, 2014

(54) METHOD AND APPARATUS FOR USE IN ACCESSING CONTENT

(75) Inventor: Steve Crystal, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1358 days.

(21) Appl. No.: 11/947,259

(22) Filed: Nov. 29, 2007

(65) Prior Publication Data

US 2009/0144642 A1  Jun. 4, 2009

(51) Int. Cl.
*G06F 3/048* (2013.01)
*G06F 3/0482* (2013.01)
*G06F 3/00* (2006.01)

(52) U.S. Cl.
CPC .............. *G06F 3/0482* (2013.01); *G06F 3/048* (2013.01); *G06F 3/00* (2013.01); *G06F 2203/04806* (2013.01)
USPC ........... 715/764; 715/708; 715/716; 715/727; 715/853; 715/854

(58) Field of Classification Search
CPC . G06F 2203/04806; G06F 3/00; G06F 3/048; G06F 3/0482
USPC .................. 715/708, 716, 727, 764, 853, 854
See application file for complete search history.

(56) References Cited

U.S. PATENT DOCUMENTS

| | | | |
|---|---|---|---|
| 6,359,615 B1 | 3/2002 | Singh | |
| 6,963,339 B2 * | 11/2005 | Leah et al. | 345/440 |
| 7,600,192 B1 * | 10/2009 | Hashimoto et al. | 715/802 |
| 2003/0043200 A1 * | 3/2003 | Faieta et al. | 345/804 |
| 2004/0252119 A1 * | 12/2004 | Hunleth et al. | 345/440 |
| 2006/0109242 A1 * | 5/2006 | Simpkins | 345/156 |
| 2006/0161863 A1 * | 7/2006 | Gallo | 715/810 |
| 2006/0176403 A1 * | 8/2006 | Gritton et al. | 348/581 |
| 2007/0085840 A1 * | 4/2007 | Asaka et al. | 345/173 |
| 2007/0168413 A1 * | 7/2007 | Barletta et al. | 709/203 |
| 2007/0192739 A1 * | 8/2007 | Hunleth et al. | 715/823 |
| 2007/0208840 A1 * | 9/2007 | McConville et al. | 709/223 |
| 2008/0312987 A1 * | 12/2008 | Damodaran et al. | 705/7 |
| 2009/0024926 A1 * | 1/2009 | Morotomi | 715/716 |

\* cited by examiner

*Primary Examiner* — Patrick Riegler
(74) *Attorney, Agent, or Firm* — Fitch, Even, Tabin & Flannery LLP

(57) ABSTRACT

Some embodiments provide methods for displaying representative organizations of content. These methods display a plurality of representations, detect a command to implement a first content zoom, select first and second organizations of content associated with first and second representations, evaluate metadata associated with the first and second organizations of content to identify first levels of additional content associated with the first and second organizations of content, where the additional contents are descriptive of the first levels of detail of the first and second organizations, and display third and fourth representations of the first and second organizations of content, respectively, and the first level of the first and second additional contents.

19 Claims, 12 Drawing Sheets

METHOD AND APPARATUS FOR USE IN ACCESSING CONTENT

BACKGROUND

1. Field of the Invention

The present invention relates generally to displaying representations of content, and more specifically to navigating through displayed representations of content.

2. Discussion of the Related Art

Typically, computing devices store and access data. Many of these devices include a graphical user interface (GUI) for displaying representations of content generally accessible through the computer device. For example, a GUI can display icons that pictorially represent, for example, a file, folder or application. A user may utilize an icon to access the content or application of which the icon is indicative.

SUMMARY OF THE INVENTION

The present invention advantageously addresses the needs above as well as other needs through the provision of methods, apparatuses, and systems for use in accessing content. Several embodiments provide advantageous methods for use in representing organizations and/or associations of content. These methods can display a plurality of representations of organizations of content; detect a command to implement a first content zoom while displaying the plurality of representations of content; select, in response to the command to implement the first content zoom, a first organization of content associated with a displayed first representation of the plurality of representations, and select a second organization of content associated with a displayed second representation of the plurality of representations; identify first metadata directly associated with the first organization of content and identify second metadata directly associated with the second organization of content; evaluate the first metadata and identify as defined in the first metadata a first level of first textual content associated with the first organization of content and descriptive of a first level of detail of the first organization of content; evaluate the second metadata and identify as defined in the second metadata a first level of second textual content associated with the second organization of content and descriptive of a first level of detail of the second organization of content; and display third and fourth representations of the first and second organizations of content, respectively, and the first level of the first and second textual contents in response to the command to implement the first content zoom.

Other embodiments provide systems for use in accessing content. These systems comprise a computer readable medium that stores content in a digital format and one or more computer programs; a display; and a processor coupled with the display and the computer readable medium, where the processor is configured to execute the one or more computer programs to: access a least some of the content from the computer readable medium; communicate with the display to display representations of the at least some of the content; detect a first instruction to implement a content zoom; select a plurality of the displayed representations in response to the first instruction to implement the content zoom; parse a plurality of metadata where each metadata of the pluralities of metadata is associated with one of the plurality of the selected representations and selecting from each of the plurality of metadata a first amount of additional content descriptive of content associated with a corresponding one of the selected representations of content; and display the selected plurality of representations and each of the corresponding first amount of additional content in response to the first instruction to implement the content zoom.

Further embodiments provide methods of displaying content. These methods display multiple representations of multiple categories of content; detect a first instruction to implement a first content zoom; select, in response to the first instruction to implement the first content zoom, first and second categories of content, where each of the first and second categories is associated with first and second representations, respectively, of the multiple displayed representations that represent the first and second categories of content, respectively; parse a first metadata associated with first content of the first category and a second metadata associated with second content of the second category, and identify from the first metadata a first amount of additional content identified within the first metadata that is descriptive of at least some of the first content of the first category and identify from the second metadata a second amount of additional content identified within the second metadata that is descriptive of at least some of the second content of the second category; and display a third and fourth representations representative of the first and second categories of content, respectively, and the corresponding first and second amounts of additional content in response to the first instruction to implement the first content zoom.

In some embodiments, the invention can be characterized as a method for use in accessing data that displays an icon on a graphical user interface, the icon being movable within the graphical user interface; detecting a selection of the icon; displaying at least one representation on the graphical user interface in response to the selection of the icon where the at least one representation is based at least in part upon metadata associated with the icon; and detecting a selection of the at least one representation.

A better understanding of the features and advantages of the present invention will be obtained by reference to the following detailed description of the invention and accompanying drawings that set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings, wherein:

FIG. 11 depicts a simplified representation of the GUI showing content associated with an alternate artist in a seventh state, in a different genre that is displayed upon selection of a related artist from;

Figure 1:
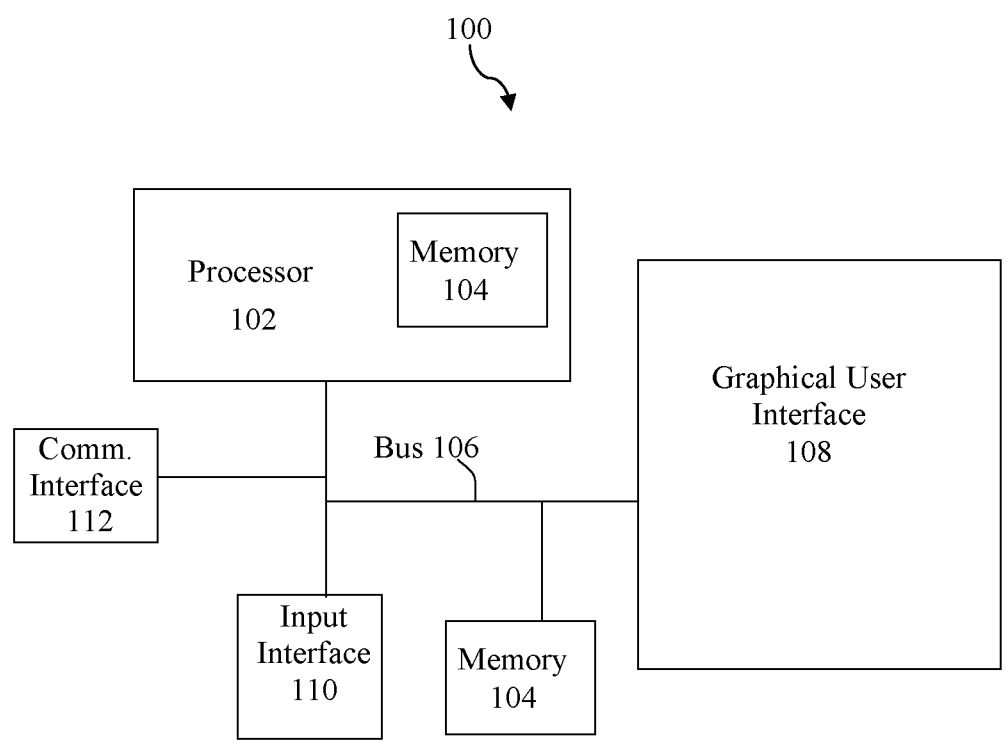
FIG. 1 is a block diagram illustrating a computing device in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in a limiting sense, but is made merely for the purpose of describing the general principles of the invention. The scope of the invention should be determined with reference to the claims. The present embodiments address the problems described in the background while also addressing other additional problems as will be seen from the following detailed description.

Referring to FIG. 1, shown is a block diagram illustrating a computing system or device 100 in accordance with some embodiments. The computing device 100 includes one or more processors 102, one or more computer readable mediums, digital data storage and/or memory 104, which can be separate from the processor 102 and/or incorporated with the processor, one or more communication links 106 such as a bus, a display 108 that is configured to display graphical user interfaces (GUI), images, text and the like, and a user interface or input interface 110.

The computing device 100 can be one of many manufactured and sold computing devices widely available, including for example, a personal computer, personal digital assistant, portable media player, cell phone, or other device having a processor and a display. As will be described herein, the computing device 100 is an electronic device that is capable, through a combination of hardware, firmware and/or software, of receiving, analyzing, displaying and/or outputting data.

The processor 102 accesses memory 104 and is operably coupled via the bus 106 to the display 108 and the input interface 110. The computing device 100 stores data, software, executables, firmware, BIOS, and the like in the memory 104. The data can include, for example, pictorial data, video data, audio data, textual content, graphical data, and/or other types of data. The processor 102 controls reading the data into or out of the memory 104, and receives inputs from the input interface 110. In some embodiments, the processor 102 outputs a pictorial or video output to the display 108.

The processor 102 can be implemented through one or more processors, microprocessors, minicomputers or other such processing devices or combinations of devices. In some embodiments the processor includes image, video and/or audio processing functionality; however, the image, video and/or audio processing functionality can be implemented through separate devices (not shown) cooperated with the processor. The memory 104 is coupled with the processor 102 and typically includes one or more processor and/or computer-readable media accessed by at least the processor 102 and can include volatile and/or nonvolatile media, such as RAM, ROM, EPROM, flash memory or other memory technology. The memory can store software, executables, scripts, data, profiles, and the like. In some embodiments, the memory stores software that implements application user interfaces providing a user with a graphical user interface (GUI) to interact with the computing device 100.

The user interface 110 allows the user to interact with the computing device 100, and can include substantially any relevant user interface. For example, the user interface can include one or more of, but not limited to, keyboard, mouse, touch pad, stylus, touch screen, a wireless remote control, a joy stick, audio input/output (e.g., speaker(s), microphone, etc.) and/or the like. These and other input devices are connected to the processor 102 through interfaces that couple to the bus 106, but can be connected by other interfaces, such as a parallel port, an IEEE 1394 serial port, a game port, a USB port, an IR interface, or other such ports. In some embodiments, the input interface 110 is a peripheral device that is coupled to the computing device 100. A user may interact with the input interface 110 of the computing device 100 to change what or how information is displayed on a GUI, to display new information on a GUI, to display a different GUI, or to produce an output, such as, for example, an audio output or a command.

The display 108 can be substantially any relevant display, such as but not limited to a liquid crystal display (LCD), cathode ray tube, light emitting diode, plasma, television display, the display of another device, or other such displays. The display 108 displays content from the processor 102, memory 104, external content (e.g., content received from over a network coupled with the computing device through the communication interface 112), other such sources or combinations of the sources.

In some instances, the processor 102 generates an output that is displayed on the display 108. Again, the displayed output can be textual content, graphical content, images, video, pictorial content, metadata, and other relevant content. Often the output comprises a GUI that is displayed and can include similar content within the GUI, including but not limited to textual content, graphical content, images, video, pictorial content, and other relevant content. The GUI allows the user to interface with the computing device 100 by selecting elements displayed, entering text, accessing additional content and other such interfacing and/or navigation through the data and/or content accessible through the computing device (e.g., using a mouse and/or keyboard).

A GUI is displayed on the display 108 that visually presents images corresponding to, for example, pictorial data, video data, metadata, or other information pertinent to a user's interaction with and/or use of the computing device 100. In some embodiments, the GUI displays icons that are representative of content, collections of content, organizations of content, associations of content, software, executables or the like accessible through the computing device 100. An icon is a graphical representation that denotes the content associated with the icon (whether a single content or a grouping, category, organization or association of content). In some embodiments, a GUI displays items such as graphical buttons, menus, a cursor, scroll bars or other graphical representations as tools for a user of the computing device 100 to interact with the computing device 100. In some embodiments, the display 108 comprises a touch screen that a user utilizes to interact with a GUI and the computing device 100. For example, a GUI can display content associated with an icon when a user touches the display 108 at a region of the GUI where a desired icon is displayed.

In many instances pictorial data is outputted and displayed. This pictorial output can comprise, for example, one or more icons displayed within the GUI. In some embodiments, the processor 102 outputs audio output corresponding to the pictorial or video output to, for example, a speaker (not shown) or audio jack (not shown) for use with a headphone set (not shown). The processor 102 comprises circuitry to perform at least the functions described throughout this description. Those skilled in the art will appreciate that circuit(s) can refer to dedicated fixed-purpose circuits and/or partially or wholly programmable platforms of various types and that these teachings are compatible with such modes of deployment for the circuitry of the processor 102. In some embodiments, the functions of the processor are implemented by software stored in the memory 104 and executed by the processor 102. Thus, the processor 102 executes instructions described herein, for example, instructions to change what or how information is displayed on a GUI, display new information on a GUI or produce an output such as a command or audio output by virtue of, for example, hardware, firmware and/or software, or combinations thereof.

The memory 104 includes memory for storage of files. The memory 104 comprises, for example, a built-in hard disk drive, non-volatile "flash" memory, removable memory, such as a compact disk (CD), digital versatile disk (DVD), or any combination thereof. The memory 104 or portions of the memory may be in the form of one or more removable blocks, modules, or chips. The memory 104 need not be one physical memory device, but can include one or more separate memory devices.

The bus 106 includes one or more wires, traces, fiber optics or other relevant communication paths that are connected between components of the computing device 100. The bus 106 transfers data and/or power between the components of the computing device 100.

Figure 2:
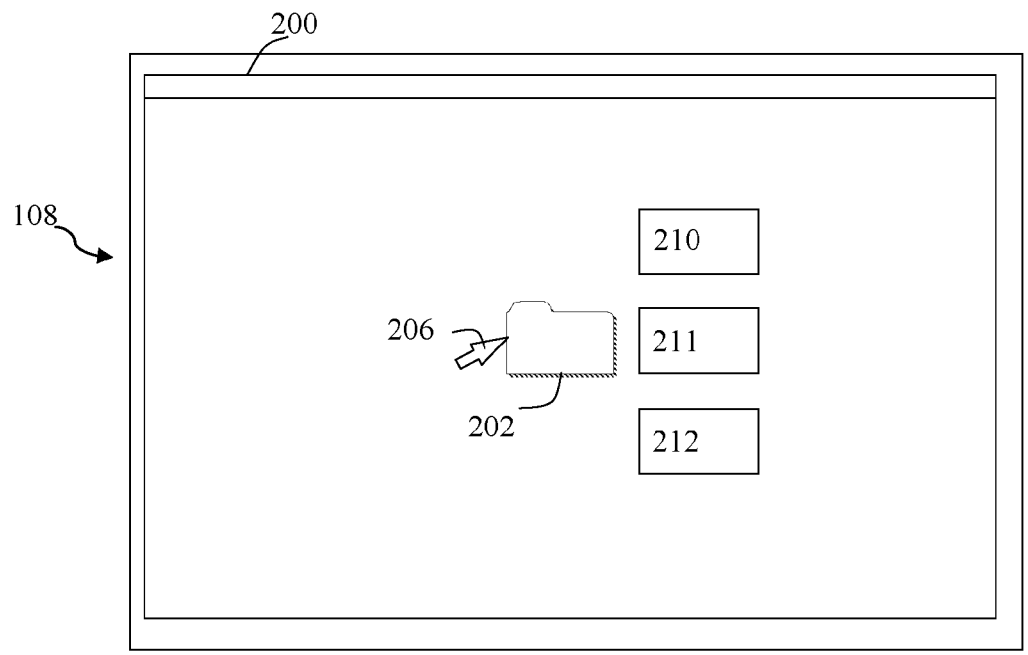
FIG. 2 depicts the graphical user interface of FIG. 1 in accordance with some embodiments.

Referring to FIG. 2, shown is a depiction of a GUI 200 displayed on the display 108 of FIG. 1 in accordance with some embodiments. Displayed on the GUI 200 are one or more icons 202, a cursor 206, and three sub-icon representations 210, 211, 212. The icon 202 comprises a graphical representation of an organization of content that is indicative of the content associated with the icon 202. The icon 202 is indicative of, for example, a file, folder, application, command, process, peripheral device coupled to the computing device 100, record, audio and/or visual media, data, metadata, and/or the contents of any of these. The icon 202 may also be referred to as, for example, a pictorial representation, a tile, a symbol, a pictogram, a picture or an image. The icon 202 is movable within the GUI 200. While only one icon 202 is shown in FIG. 2, it is anticipated that a plurality of icons could be displayed within the GUI 200 and that each of the plurality of icons would have similar characteristics and function as the icon 202 described herein.

The cursor 206 is an indicator on the GUI 108 and may also be referred to as a marker or pointer. The cursor 206 is movable within the GUI 108. In some embodiments, the input interface 110, such as a mouse or touchpad, may be used by a user to move the cursor 206 within the GUI 108. In some embodiments, the computing device 100 includes a touch screen and the cursor 206 is movable within the GUI 108 by virtue of a user or an apparatus touching the touch screen and moving the point of contact about the touch screen. Items displayed on the GUI 108, for example icons, buttons, menus or a scroll bar, may be selected by placing the cursor 206 over the region of the GUI 108 where the item is displayed.

The icons can be links or hyperlinks to other content, software, executables and the like. In some instances, the three sub-icon representations 210-212 are based at least in part upon metadata associated with the icon 202. Each of the sub-icons 210-212 is movable, in some embodiments, and typically is movable within the GUI independent of the icon 202 and other representations. For example, a first sub-icon representation 210 is moved within the GUI while the icon 202 and a second sub-icon representation 211 and a third sub-icon representation 212 remain stationary. Although three sub-icons 210, 211, 212 are displayed in FIG. 2 substantially any number of icons and/or sub-icons can be displayed (or partially displayed depending on the application of the GUI).

In some instances, the three sub-icons 210-212 are displayed in response to a selection by a user of the icon 202. In other words, FIG. 2 depicts the GUI 200 after the icon 202 has been selected. Selecting the icon 202 provides an indication to the processor 102 that the status of the icon 202 is changed relative to other items on the GUI 200. A user affects a change in status of the icon 202 by interacting with the input interface 110, for example, to move the cursor 206 over the region of the GUI 108 where the icon 202 is displayed. According to some embodiments, a user need not provide a command input, such as clicking or double clicking a mouse, tapping or double tapping a touchpad, or striking an Enter key on a keyboard, to select the icon 202. Rather, for example, simply moving the cursor 206 over the icon 202 changes the status of the icon 202 and thus selects the icon 202. In response to the interaction with the icon 202, the graphical representation of the icon can be altered or metadata associated with the icon can be displayed. In some applications, selecting the icon 202 or sub-icons 210-212 causes the processor to access content associated with the selected icon or sub-icon. For example, where the icon 202 is indicative of a folder, selecting the icon 202 comprises opening the folder such that the contents of the folder (e.g., sub-icons representative of sub-folders or content associated with the folder of the icon 202) are displayed.

The position of the icon 202 and/or sub-icons 210-212 when displayed can be in substantially any location and can depend on the number of icons and/or sub-icons to be displayed, the size of the GUI 200 and other relevant factors. In some instances, an icon or sub-icon of interest may be depicted at a predefined location, such as a center of the GUI. As shown in FIG. 2, the icon 202 is centrally located on the GUI 200. The cursor 206 is moved to be over the region of the GUI 200 where the icon 202 is displayed, and when the icon 202 is selected the sub-icon representations 210-212 are displayed.

In some embodiments, displaying items on the GUI 200 comprises outputting pictorial or video data to the display 108 from the processor 102. The graphical characteristics of the icon 202 or sub-icons displayed on the GUI 108 can be determined by instructions executed at the processor 102. Additionally, in some implementations the three sub-icons 210-212 are based at least in part upon there relationship with the icon 202 and/or metadata associated with the organization and/or content represented by icon 202. The three sub-icons 210-212 appear on the GUI 108 through a gradual transition, a wipe, an abrupt appearance, or other transition methods as are known in the art.

Metadata comprises data associated with an item (e.g., a file, a song, a video or other relevant content), and in some instances can provide information about the associated content or item, be used to relate items to one another based, for example, on similarities or other relationships between the items' associated metadata. For example, metadata associated with the icon 202 comprises data about content represented by the icon 202 and/or the organization of data associated with the icon 202. As a further example, if the icon 202 is indicative of a file, then metadata associated with the icon 202 can include data about the file (e.g., the size, name or other such data about the file). Further, if the icon 202 is indicative of a file storing media content (e.g., a song or album of music), the metadata associated with icon 202 can comprise data related to the content (e.g., video, songs, albums, etc.), names of artists, performers, actors and authors, a genre to which the content is associated, art or video, a time the content or data was created, the period of elapsed time since the data was created, the length of playback (e.g., of a song or video, movie, etc.), liner notes, the size of a file, one or more tags, bookmarks, other data and/or combinations of data associated with the icon 202. A tag can include a word or term associated with or assigned to a piece of information, which may be assigned by a user, content owner, content distributor or the like, to serve as a link to other content, for example, to a web page or other content that is relevant to the word or term that comprises the tag.

Referring to FIG. 2, the icon 202 comprises, for example, the folder dedicated to a single artist having three albums, and the three representations 210, 211, 212 comprise, for example, album art for the respective three albums of the artist. In some embodiments, the three representations 210, 211, 212 are displayed as text. For example, the names of the three albums in the above example are textually presented in response to the icon 202 being selected. In some instances, selecting the text of one of the sub-icons 210-212 causes the album art, liner notes or other pictorial representation of data associated with the respective selected album to be displayed.

Figure 3:
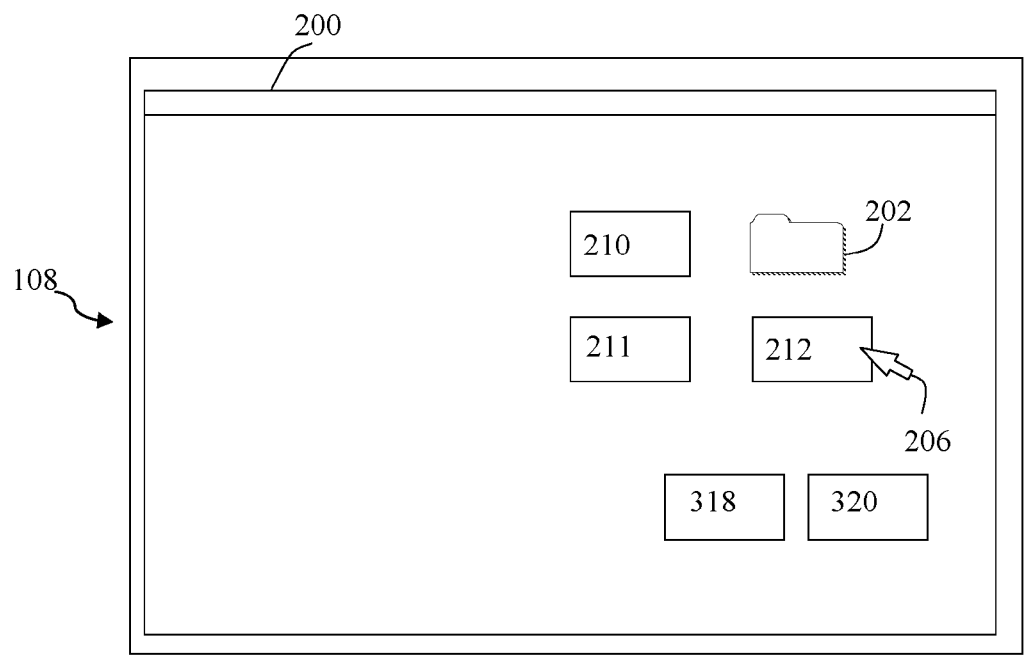
FIG. 3 depicts the graphical user interface of FIG. 1 in accordance with some embodiments.

Referring to FIG. 3, shown is a depiction of the GUI 200 displayed on the display 108 of FIG. 1 in accordance with some embodiments. Displayed are the icon 202, the cursor 206, the three sub-icon representations 210, 211, 212 and two subsequent icon representations 318, 320. The two subsequent icons 318, 320 are similar to the three sub-icons 210-212 and represent content that may be similar to content represented by the three sub-icons, where the two subsequent icons 318, 320 are based at least in part upon metadata associated with the content item, and in some instances one or both are based in part upon an association with one or more of the sub-icons 210-212. Typically, one or both of the two subsequent icons 318, 320 are displayed in response to selecting one of the sub-icons, such as the third sub-icon 212. In other words, FIG. 3 depicts the GUI 200 after the sub-icon 212 is selected.

In FIG. 2, the icon 202 is centrally positioned in a first location on the GUI 200 with the sub-icons 210-212 displayed in a first orientation. In FIG. 3, the icon 202 is displayed in a second location, for example, at a corner of the GUI 200. Further, the three sub-icons are similarly adjusted (for example because of the minimal space between the icon 202 and the edge of the GUI 200) to a second orientation. Further, the subsequent icons 318 and 320 are displayed in an orientation relative to the second orientation of the sub-icons (e.g., proximate the third sub-icon 212). The repositioning of the icons, can in some instances, provide some relevance of the icons, for example, by positioning the selected icon 212 at or near a center of the GUI 200 with the associated icons distributed about the selected icon. Additionally or alternatively, the repositioning of the icons can be based on the number of icons and/or information relevant to content represented by the icons to be displayed in the GUI 200.

By way of example, in some embodiments, a movable icon 202 is indicative of a file representing a genre of music. The genre is selected by a user and a plurality of movable representations are displayed each comprising a pictorial icon and/or textual name of an artist from within the genre, the representations based at least in part upon metadata associated with the genre file. One of the representations of an artist is then selected by the user. As a result of the selection, a plurality of subsequent representations that are movable are displayed each comprising a pictorial icon and/or textual name of an album of the selected artist, the subsequent representations based at least in part upon metadata associated with the genre file. One of the subsequent representations of an album is then selected by the user. In some embodiments, subsequent representations continue to be displayed to the user, each subsequent representation based upon the metadata of the genre file. For example, the subsequent representations could be liner notes, text lyrics, album art, photos, time length of songs on the album, song titles, related artists or other representation based upon metadata. In some embodiments, by selecting a subsequent representation, the user can execute a command to open or play the selected content item.

In some embodiments, the icons and representations can be displayed in the window in a layout that attempts to maximize the number of icons and/or representations visible for the current magnification or zoom level. When a size of the GUI is changed (e.g., by a user or the computing system 100), one or more displayed icons and/or representations can be repositioned appropriately, for example, using a sliding transition (e.g., moving icons appear to slide around one another to reach new positions), according to an indicated order (e.g., alphabetically, by name, left to right then top to bottom). Alternatively as described above, other transition effects could be used, such as fading in and out, or allowing icons to slide or jump over and under one another. Similarly, when the user changes a magnification or zoom level, the icons can be repositioned appropriately. For example, if the current view of a GUI allows two icons to be displayed horizontally, when a change in the size of the GUI is made that would allow three icons to be displayed horizontally, the icons slide around to use the newly available space and maintain the correct order. If changes occur to the window automatically (such as automatic resizing of a GUI or panel) the icons can also be repositioned, and in some instances a magnification or zoom level can also be adjusted automatically, with or without repositioning icons. In another example, other changes affecting displayed icons also cause the icons to reposition such as a change in the displayed order, the addition or removal of icons, or a change to the characteristics of the icons or tiles (e.g., size of the icon or the amount of information shown with the icon).

As an example, dynamic adjustment can be implemented when displaying content available through a distributed network, such as the Internet, where files available for download from a remote source, such as an online music service are displayed using the position functionality described above and further below. Icons from search results or categories presented during browsing can be displayed and their positions dynamically adjusted as the GUI displaying the icons changes (configuration, zoom, etc.). The above example describes an application to a music download service, but the display functionality described can similarly be applied to other data, content, resource items, and/or items for order as well (e.g., spreadsheets, documents, network resources, video content and/or audio content, images, games, merchandise, etc.).

Figure 4:
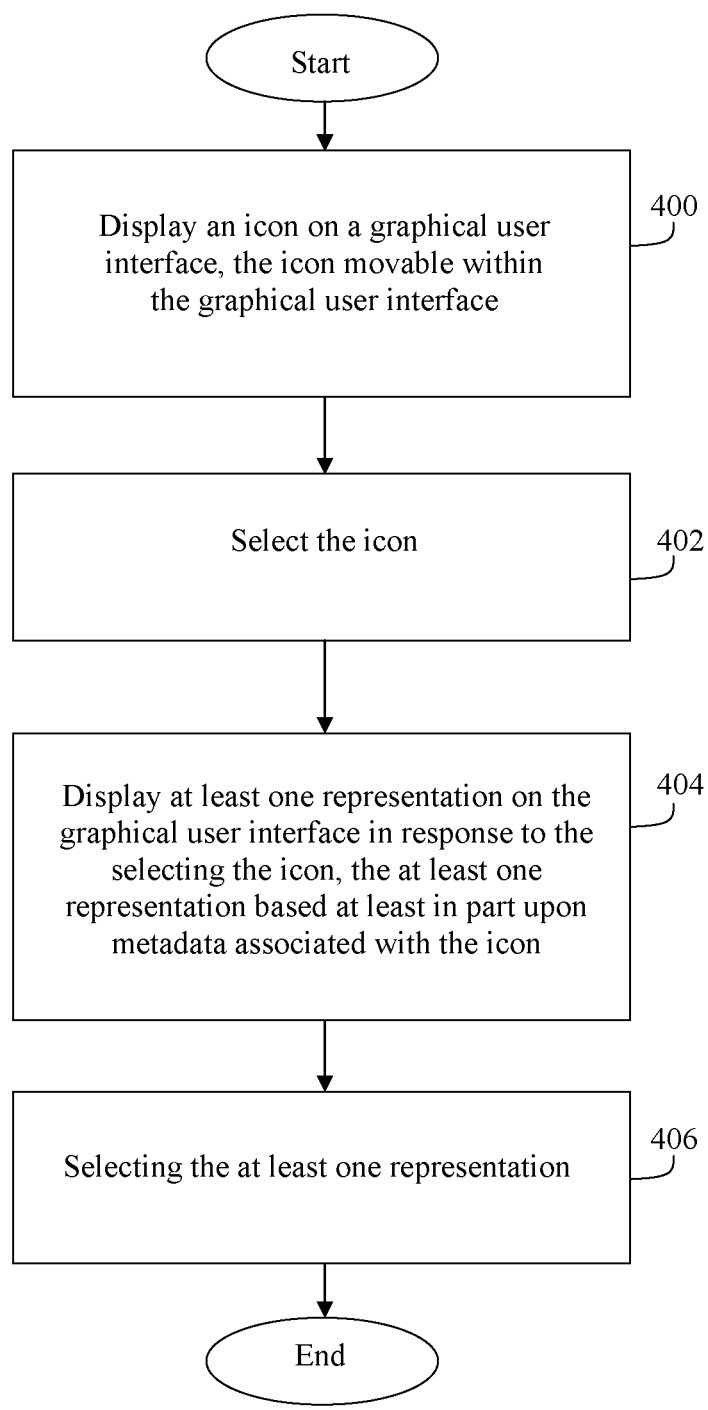
FIG. 4 is a flow diagram illustrating a method for use in accessing data on a graphical user interface in accordance with some embodiments.

Referring to FIG. 4, shown is a flow diagram illustrating a process for use in accessing data on a graphical user interface in accordance with some embodiments. The following steps can be executed, for example, on the computing device 100. In step 400, the computing device 100 is adapted to display an icon (e.g., icon 202) on the graphical user interface 200, the icon movable within the graphical user interface. In step 402, the computing device 100 is adapted to allow the icon 202 to be selected. In step 404, the computing device 100 is adapted to display at least one sub-icon (e.g., 210) on the graphical user interface 200 in response to the selecting the icon 202, where the at least one sub-icon 210 is displayed based at least in part upon metadata associated with the content represented by the icon 202. In step 406, the computing device 100 is adapted to select the at least one sub-icon 210 to display content and/or display subsequent icons displayed based at least in part upon metadata associated with the content represented by the icon 202 and/or sub-icon 210.

In some embodiments, the GUI 200 allows a user to navigate through the representations of content in an attempt to access desired content. Some navigation includes a content zoom-in displayed through the GUI. This zooming can simplify the navigation through the representations and/or information associated with content to allow a user to more easily and rapidly identify and/or access content. In part, the content zoom displays additional information and/or more detailed information associated with content represented by one or more icons or sub-icons, and/or data depicted through the GUI. The content zoom can be implemented by a user through content zoom buttons (e.g., zoom-in and zoom-out), a scroll bar, one or more keys or combinations of keys on a key board and/or mouse (e.g., a control key (CNTL) while simultaneously selecting an up or down arrow key; a selection of the CNTL key while rotating a wheel and a mouse, or the like), selecting displayed buttons depicted on the GUI (e.g., displayed zoom-out and zoom-in buttons), selecting an area within the GUI to zoom-in on, or other such activations.

Figure 5:
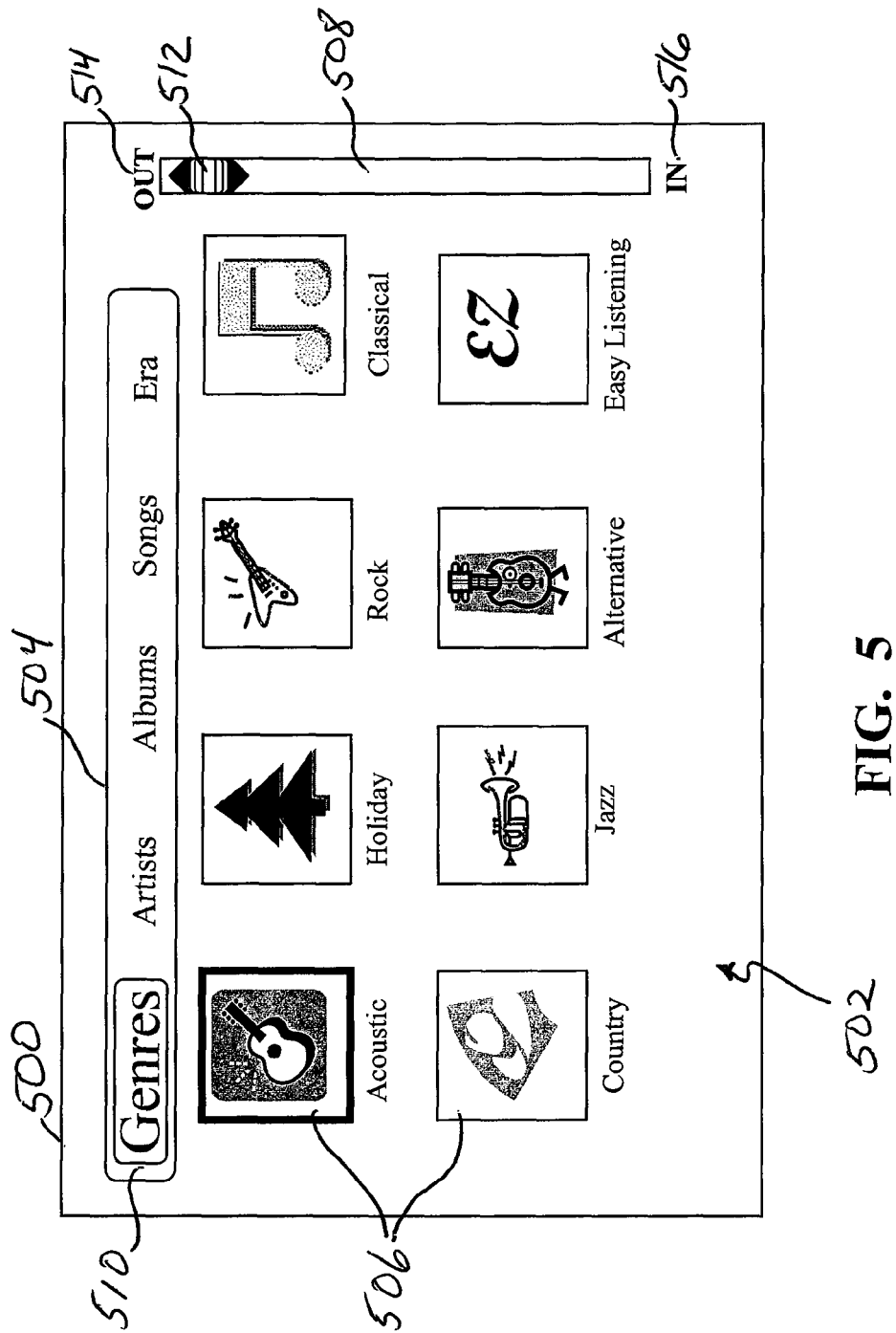
FIG. 5 depicts a simplified representation of a GUI according to some embodiments.

FIG. 5 depicts a simplified representation of a GUI 500 according to some embodiments. The GUI 500, similar to the GUI 200 depicted in FIG. 2, provides a user with an interface to interact and in part control the computing device 100. The GUI 500 shown in FIG. 5 is depicted in a first zoomed state 502 with representations 506 of organizations and/or associations of content, with the representations being icons 506 in this example, while the representations can be depicted in other ways, such as textually, graphically, or other such ways or combinations of ways. The organizations can include categories, logic containers, content associations and the like in organizing content. Further, the GUI includes a menu 504 of buttons or options, one or more icons 506 and a content zoom scroll bar 508. The icons 506 are representative of content organized or identified as being part of a grouping, and as described above can be selectable to display sub-icons and/or subsequent icons associated with the icon. As an example, the icons 506 can represent different categories of data, such as genres of music or movies, an organization of data (e.g., alphabetical), and other such representations. Below, the use of the content zoom is described relative to musical content where the content zoom provides a user with greater and/or more detailed information. However, it will be apparent to those skilled in the art that the content zoom can be applied to many different types of content and the fact that the below description is described in relation to musical content should not be viewed to narrow the scope of the invention. Instead, the content zoom described below can be applied to substantially any content stored and/or accessible by a computing device such as but not limited to video content, photographic content, textual content, word processor content, image content, products, and other such content. Metadata used in defining and/or associating content can comprise substantially any relevant association, categorization, listing, cooperation, such as, but not limited to, genre, era, age appropriateness, price, ratings, product category, intended use, source, intended destination, content distributor, content owner, type of distribution, intended user(s) or recipient(s), devices capable of using, time, use, popularity, user designations and other such factors.

As introduced above, in the example of FIG. 5 the icons 506 can represent different genres of music, such as acoustical music, holiday music, rock music, classical music, country/western music, jazz, alternative music, easy listening music, and/or other such genres or organizations of music. Alternatively, the icons 506 could represent different artists or groups of artists, different albums, different types of songs, songs and/or albums associated with a time or era (e.g., the '50s, the '60s, the '70s, and the like) or other such organizations. It is noted that some musical content may be associated with more than one metadata category. For example, a song can be categorized as a holiday song and also as a jazz song. In the example depicted in FIG. 5, the icons 506 represent genres of music, for example, based on a selection by a user (or by the computing device 100) of the genre button 510 of the menu 504 displayed on the GUI 500. In some implementations, the processor 102 based on the application of software automatically selects or highlights an entry, icon or the like depicted in the GUI 500 upon displaying the GUI 500 and entries, items, icons or the like, and in displaying subsequent zoomed states. In the example depicted in FIG. 5, the acoustic icon is highlighted. The selection of an icon or entry upon displaying the GUI 500 or a subsequent zoomed state typically is based on prior selections by the user in the previous zoomed states (e.g., what icon or entry displayed in a previous zoomed state was selected when a content zoom was initiated).

The content zoom scroll bar 508, in the example depicted in FIG. 5, is depicted with a scroll indicator 512 proximate a zoomed out end of the scroll bar. In some embodiments, the accessing of the musical content icons 506 could have been implemented through one or more previous zooms (e.g., from a GUI showing icons of "music," "movies," "photos," "home videos," "textual content" and/or other such content organization, which may have been accessed through a higher level of organization and/or categorization). A user can implement a content zoom by selecting the scroll indicator 512 (e.g., with a mouse) and sliding the scroll indicator along the zoom scroll bar 508. Additionally or alternatively, in some implementations a user can select the "out" or "in" zoom options 514 or 516, respectively; by selecting within the zoom scroll bar 508 a portion above or below the scroll indicator, to implement a content zoom out or in, typically by a predefined amount or step (which may vary depending the level of zoom at the time the in or out option is selected); select a button on a keyboard or remote control; or other relevant action.

Figure 6:
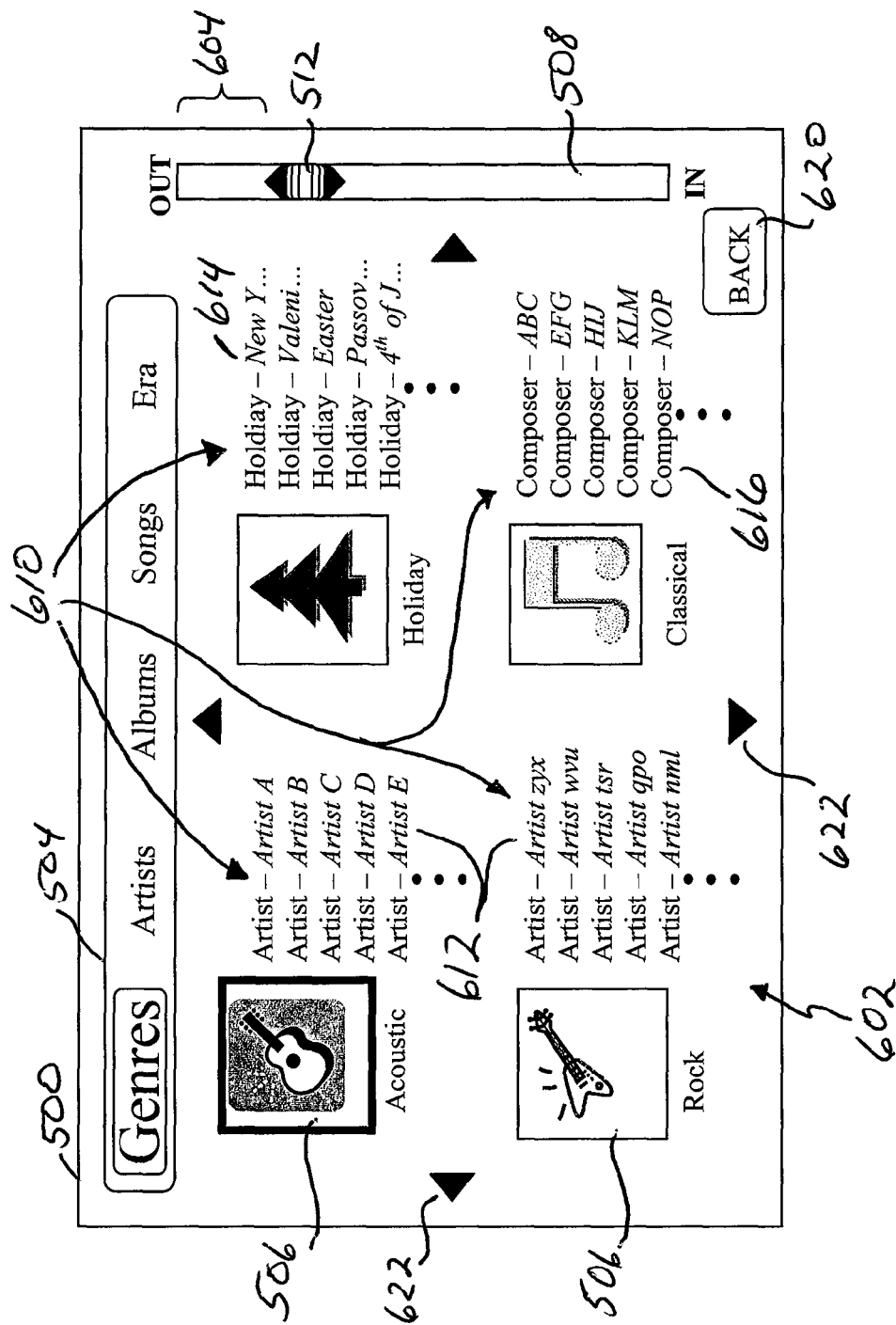
FIG. 6 depicts a simplified representation of the GUI in a second zoomed state following a zoom-in from the state of the GUI in FIG. 5.

Upon activating a content zoom-in from the first state 502 of the GUI 500 shown in FIG. 5, a content zoom is implemented to display addition textual and/or graphical content information associated with one or more of the icons 506 displayed in the GUI of FIG. 5. FIG. 6 depicts a simplified representation of the GUI 500 in a second zoomed state 602 following a content zoom-in from the first zoomed state 520 of the GUI depicted in FIG. 5. It is noted that the GUI 500, in some implementations, can be replaced by a subsequent GUI with at the second zoomed state 602 with the revised display of representations and additional information. The scroll indicator 512 is moved a distance 604 from the zoom-out end of the zoom scroll bar 508, and depicts a sub-set of the icons 506 that were depicted in the first zoomed state 502 shown in FIG. 5, and further shows additional content 610, which can comprise additional and/or more detailed information, textual content, graphics, or other content or combinations of content, associated with the content represented by each icon 506 when relevant. For example, the icons 506 may be genre icons of music, such as, acoustical music, holiday music, rock music and classical music (e.g., from the top row of icons of FIG. 5). As such, in this example, multiple representations of organizations of content (e.g., multiple representations of genres of music) are selected and displayed in the second zoomed state 602.

In some instances, the zoom further repositions the icons from a previous state based on the size of the GUI 500, the number of icons and size of icons to be displayed, the amount of metadata associated with the contents represented by the icons, additional content 610 to be displayed and other such factors. The result of the content zoom-in effectively focuses in on a content represented by a selected subset of the icons 506 depicted in the previous state, positions those icons within the GUI 500 and displays a level of detail of additional content and/or more detailed information about content represented by the selected categories, organization and/or icons. The selected representations can include one or more representations depicted in the previous state when performing a content zoom-in, and includes additional representations of organizations of content that are associated with representations displayed in the previous state when performing a content zoom-out. The content zoom may further show a more detailed and/or an enlarged view of one or more of the icons or graphics of the icon. Further, the content zoom in some embodiments attempt to maximize the amount of additional information and/or the number of icons visible for the current zoom level by positioning the icons and associated information accordingly. The repositioning may be displayed through a sliding transition (e.g., icons appear to slide around one another to a destination position) according to an indicated order (e.g., alphabetically, most popular, left to right then top to bottom, etc.). Other transitional effects as described above can provide the change in the GUI 500, such as fading in and out, icons to jump, and other such changes.

As introduced above, the content zoom further provides a zoom of relevant content by displaying a level of additional content 610 relevant to the content represented by the icons 506. The additional content 610 provides the user with information and/or more details, which in some instances is textual content that is descriptive of the level of detail of the organization of content, that can be used to locate and/or identify related content in order to further aid in searching for desired content. For example, the additional content 610 may identify artist or performers 612 associated with the displayed genre, a further organization of the content 614 (e.g., different holidays that have content associated with that holiday), a composer or company 616, and/or other such additional information. The additional information is typically extracted from metadata associated with the underlying content items. For example, content stored within memory 104 can be identified by many factors, such as title, association with other content (e.g., genre, album, artist, etc.), artist, lengths of playback, size of files and other relevant information. The amount of additional data 610 displayed in the second zoomed state 602 depends on many factors, such as but not limited to, the size of the GUI 500, the number of icons 506, the amount of additional content 610, navigation options or buttons and other relevant factors. In some instances, a portion of the additional content is displayed followed by an indication that further information is available.

Further in some implementations, some or all of the additional content 610 can be selectable. For example, the additional content can define links to the identified content. A selection, for example of "Artist B" identified as associated with the acoustical music genre may direct the user to a new view in the GUI with further information and/or specific details about "Artist B." Further, the GUI 500 in the second zoomed state 602, in some embodiments, may include navigation options or buttons that can aid the user in navigating through the representations of content and/or the additional information 610. For example, the GUI 500 may continue to display the menu 504, and may additionally or alternatively include a "Back" or up button 620 that would return to a previous zoom state (e.g., the GUI in the first state 502), arrow buttons 622 (for example, to allow the user to shift icons 504, such as to other genres) and/or other such navigation functions.

Figure 7:
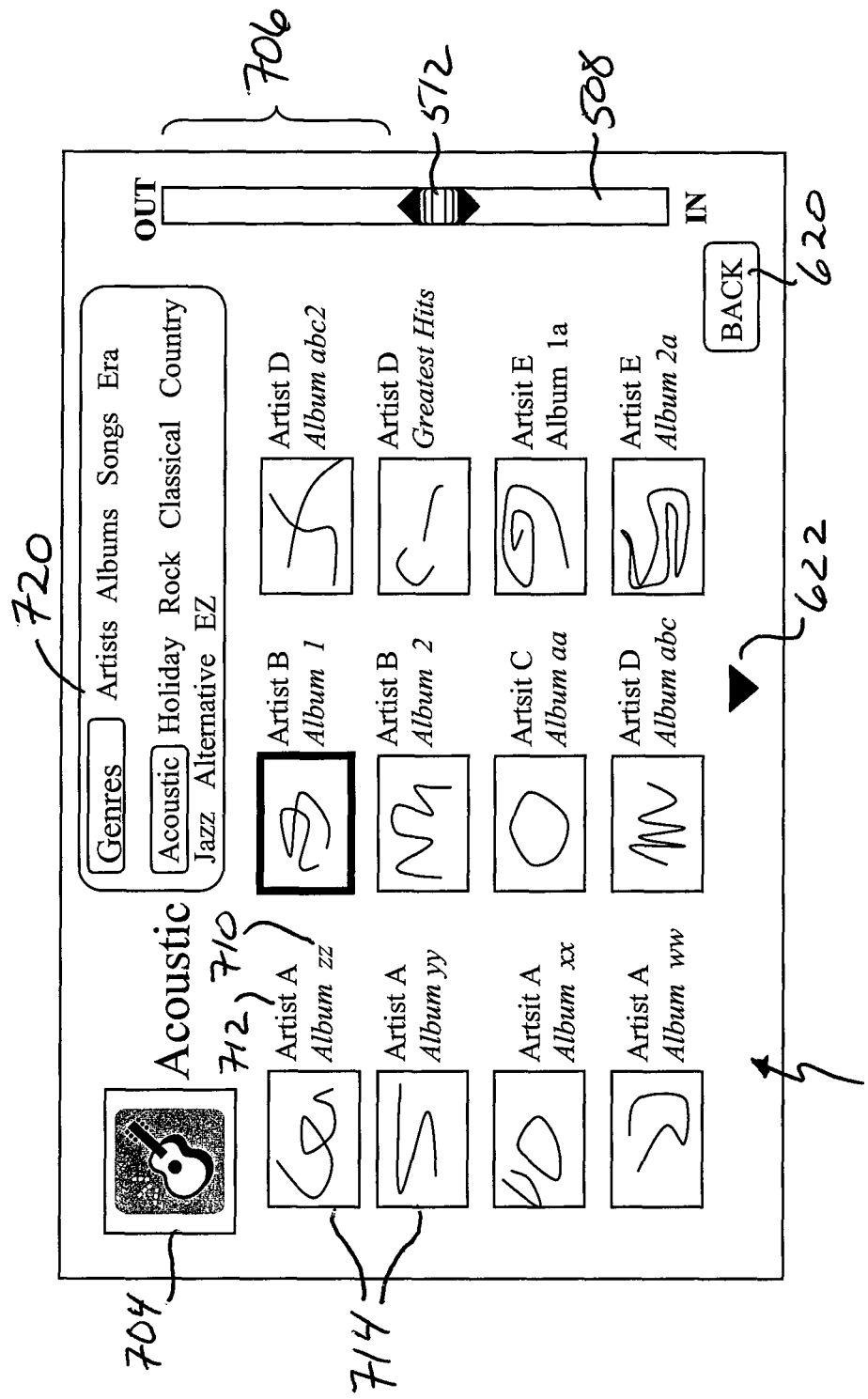
FIG. 7 depicts a simplified representation of the GUI at a content zoomed-in third state following a subsequent zoom-in from the second state depicted in FIG. 6.

FIG. 7 depicts a simplified representation of the GUI 500 at a content zoomed-in third state 702 following a subsequent zoom-in from the second state 602 depicted in FIG. 6. The zoomed-in state is indicated on the zoom scroll bar 508 with the scroll indicator 512 shifted a distance 706 from the zoom-out end of the zoom scroll bar.

As with the prior content zoom, the content zoom to the third state 702 provides the user with still further information and/or more detailed information associated with one or more of the content represented by one or more of the icons 504 depicted in the GUI 500 at the second state 602. Again the number of icons and data displayed in the GUI 500 depends on many factors as described above such as, but not limited to, the amount of and/or number of content available, the number categories or other organizational levels, the amount of metadata associated with each content item, user defined parameters and other relevant factors. Additionally, the number of icons in the second state 602 may be a factor in the systems determination of the number of icons displayed in the third content zoom state 702, as well as the size of the window defining the GUI 500. Further, one or more icons 506 from a prior state, in this example, the second content zoom state 602, can be selected or highlighted by the user or the system. As described above, upon implementing a zoom-in or a zoom-out, the processor 102 based on the application of software implementing the GUI and content zoom automatically selects or highlights an entry, icon or the like depicted in the GUI 500, and can be changed by the user in selecting an icon or entry using a pointing device, remote control, keyboard or the like.

In the example shown in FIG. 7, the content zoom to the third state 702 zooms in on content represented by and associated with a single icon from the second state 602, such as the acoustic icon 704 representative of musical content associated with the acoustic genre. The information provided in the content zoom at this state can include additional and/or more detailed information providing the user with still further information that can be used in identifying or locating content. In this example, one or more album artists 712 (e.g., "Artist A," "Artist B," etc.) are displayed in addition to one or more album or song titles 710 associated with the artist (e.g., "Album zz" associated with "Artist A," "Album 2" associated with "Artist B," etc.). Additionally in some instances the album art 714 or an image of the album, artist, group or other image can also be displayed. Still further information and/or alternative information can be displayed depending on the size of the GUI 500, the number of artists, albums, titles, or the like, and the amount of metadata associated with the depicted artists to be displayed and other relevant factors such as those described above. The album art 714 and/or the textual information (e.g., artist name 712 and album title 710) can be implemented as links to additional content and/or can trigger events. For example, selecting the album art 714 could result in a further content zoom, cause an enlarged view of the art to be displayed and/or further information more specific to the selected album art to be displayed. Additionally or alternatively, the processor 102 can initiate the playback of one or more songs associated with the selected album. Similarly, selection of the album title 710 could cause more specific information about the album to be displayed and/or the playback of one or more songs from the album; and the selection of the artist's name 712 may cause additional information, albums and/or songs from the artist to be displayed when additional information, albums or songs are identified and accessible through the computing device 100.

Navigation options or buttons can also be provided, such as the "back" button 620, one or more arrow buttons 622 or other such options. A navigation or menu bar 720 may also be provided in some embodiments that allows further control and/or navigation through the content and content zoom functionality. The menu bar 720 can further provide the user with information regarding the search and/or access being preformed, for example, by identifying the categories being accessed (e.g., by highlighting "Genre" and "Acoustic").

Figure 8:
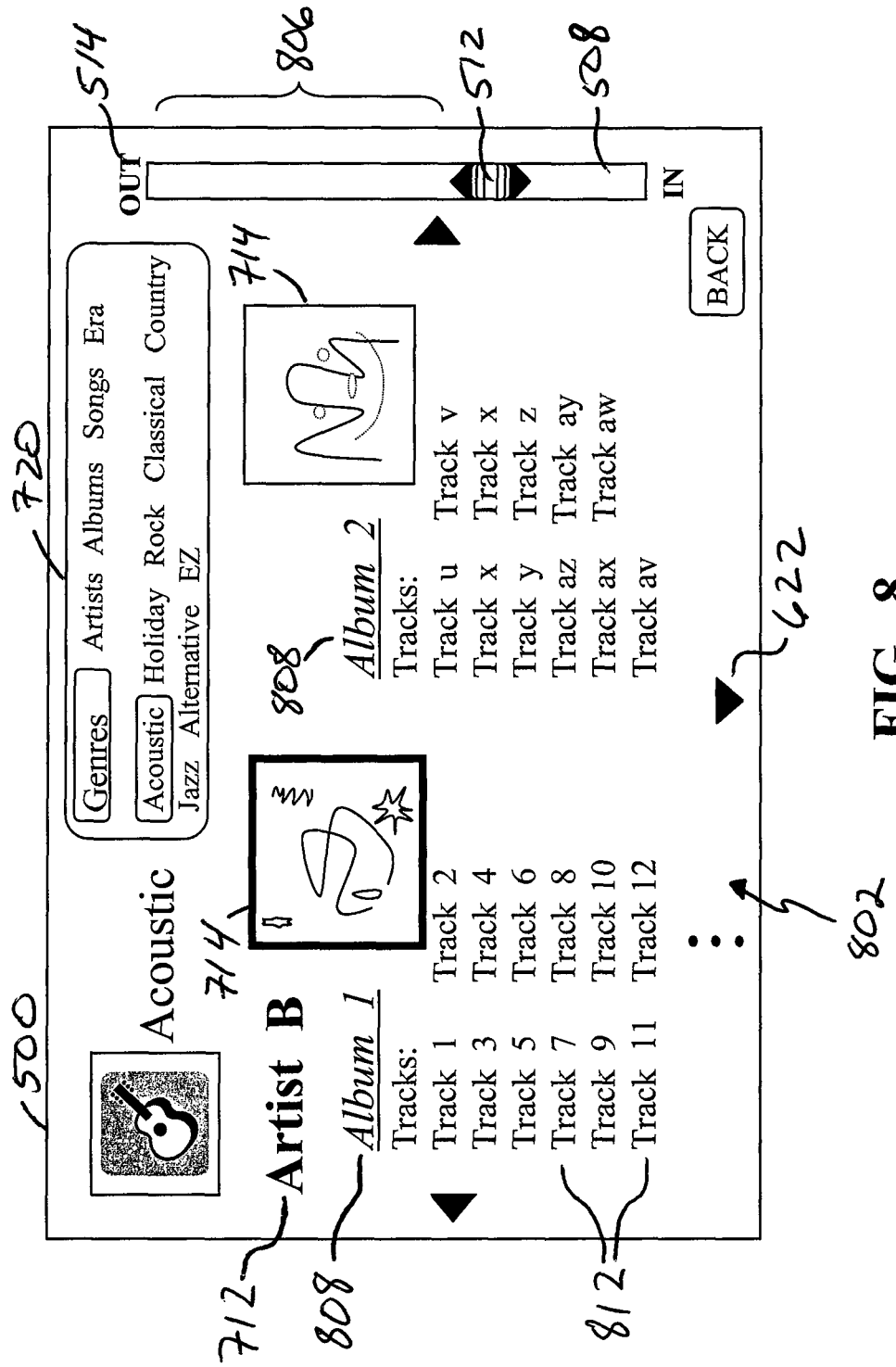
FIG. 8 depicts a simplified representation of the GUI at a fourth content zoomed state following a subsequent zoom-in from the third state depicted in FIG. 7.

FIG. 8 depicts a simplified representation of the GUI 500 at a fourth content zoomed state 802 following a subsequent zoom-in from the third state 702 depicted in FIG. 7. The zoom-in is indicated on the zoom scroll bar 508 with the scroll indicator 512 shifted a distance 806 from the zoom-out end of the zoom scroll bar. The content zoom provides still further information that allows the user to evaluate the entries and/or entities of additional content. In this representative example, the fourth state 802 identifies a selected artist (e.g., "Artist B") and further includes entities that identify one or more albums 808 from the third state 702, for example "Album 1" and "Album 2," with additional information about the albums, such as the name of the tracks 812 (or portions of names of a track) and other such relevant information, which might include length of playback of the tracks, singer if potentially different singers, date recorded and/or released and other relevant information. The GUI 500 shifts the positioning of the entities, entries and/or icons in an attempt to fit the information and representations within the GUI 500 and/or adjusts the amount of information provided depending on factors such as those described above including the amount of information to be displayed. In some instances an amount of available area within the GUI is determined and divided into sub-areas where content is incorporated.

Further, the album art 714 may be shown, and in some instances is shown in an enlarged or more detailed view. The entries and/or items depicted in the GUI 500, such as the album art 714, one or more tracks 812 and other items of the GUI again may be selectable as links to content, the initiation of playback of a track on the album and/or other actions by the processor 102. For example, the album title 808, artist name 712 and/or tracks 812 can be links to additional content and/or the activation of playback. Navigation options can also be provided in some instances, such as menu bar 720, arrows 622, back button 620 or other such navigation options. The user and/or the processor 102 can select or highlight an entry or item of the GUI 500, such as the album art 714 of "Album 2."

Figure 9:
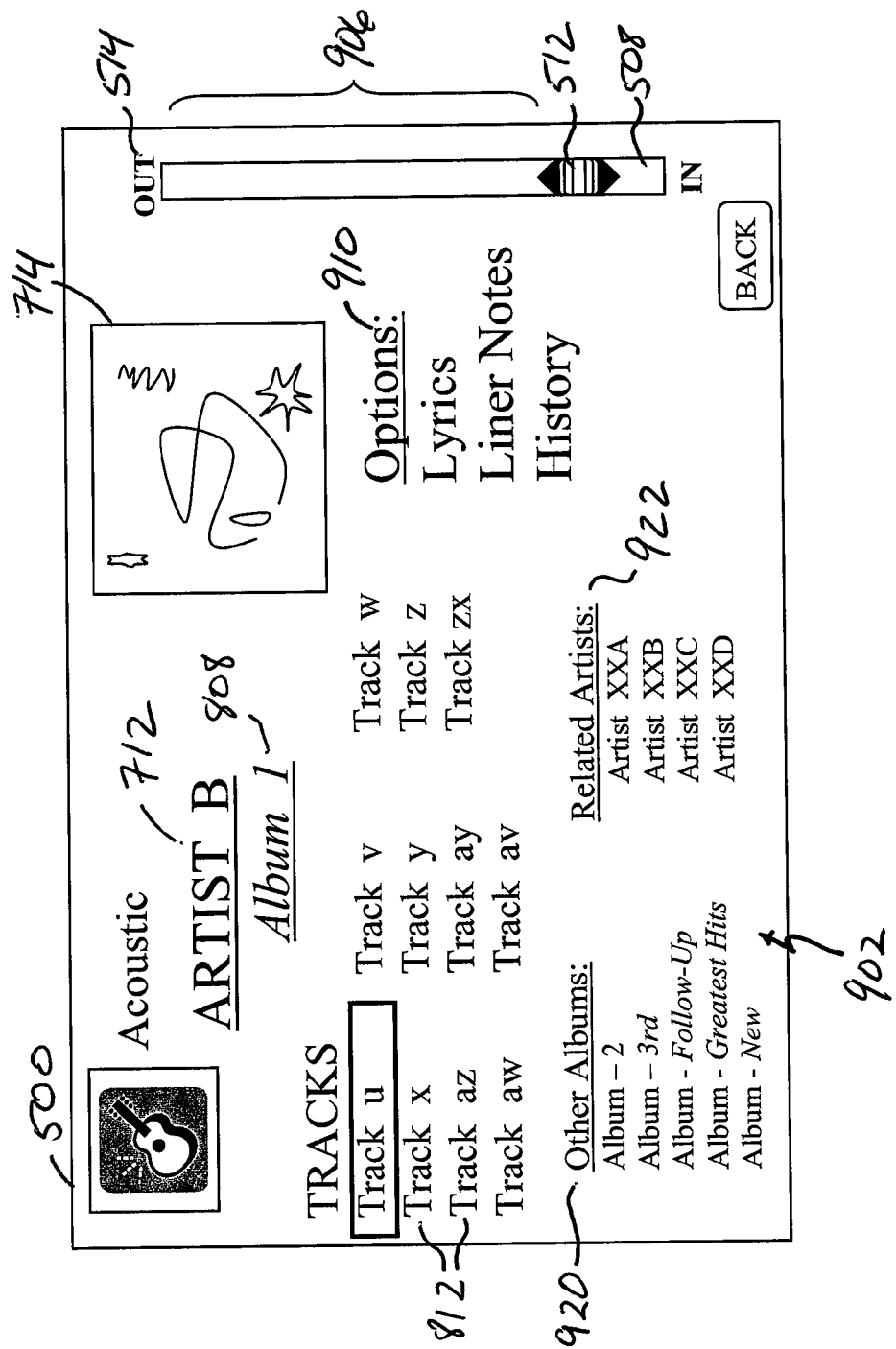
FIG. 9 depicts a simplified representation of the GUI at a fifth content zoomed state following a subsequent zoom-in from the fourth state depicted in FIG. 8.

FIG. 9 depicts a simplified representation of the GUI 500 at a fifth content zoomed state 902 following a subsequent zoom-in from the fourth state 802 depicted in FIG. 8. The zoom-in is indicated on the zoom scroll bar 508 with the scroll indicator 512 shifted a distance 906 from the zoom-out end of the zoom scroll bar. The content zoom provides yet further information associated with the content of interest. In this representative example, the fifth state 902 identifies an artist 712 (e.g., "Artist B") and an album 808 from the fourth state 802, for example "Album 1," with additional information about the album. The information provided in the fifth content zoom state 902 can include, for example, the artist's name 712, the name of the tracks 812 (or portions of names of the track), album art 714, and other such relevant information, which might include length of playback of the tracks, singer if potentially different singers, date recorded and/or released and other relevant information. Further information is provided by the content zoom such as additional options 910 associated with the album and/or tracks, such as access to lyrics, liner notes, history of the album and/or track and other such information. Still other information may be available such as other albums 920 from the same artist (e.g., "Artist B"), related artists 922, related albums, and other such information.

As described above for some embodiments, the additional information or content is defined by metadata associated with the content represented in the GUI 500, such as in this example, the album, the genre, the artist and the like. Based on the prior zoomed state and the direction of zooming (whether zooming in or out) the metadata is evaluated upon an activation of a content zoom to identify the additional information and/or content to be displayed. The type and amount of additional information displayed can depend on many factors as described above, including the size of the GUI 500, the amount of metadata and information available to be displayed and other such factors. The examples above show five states of zoom (i.e., states 502, 620, 702, 802 and 902). The present embodiments can be implemented with fewer or more states. The number of states can similarly depend on many factors such as the amount of information and/or additional information or content to be displayed in the GUI 500, the size of the GUI, and the like. For example, should a genre be selected with only a single album associated with the genre a second zoomed state may be similar to the fifth state 902 depicted in FIG. 9. Similarly, in those instances where there is a limited or relatively small amount of metadata and/or additional information, the levels or states of zoom may be limited, because the implementation of one or two content zooms may display all the available and relevant additional information. Additional content zoom states, however, can also be provided in some instances where still further additional information may be available.

Still referring to FIG. 9, as introduced above some or all of the information, content and/or graphics in the GUI 500 can be links to other content, such as accessing lyrics for one or more tracks, accessing liner notes, accessing a history of a track or album or video associated with a track, accessing content associated with a related artist 922 or album 920 and/or accessing other such content. Similarly, one or more links may cause an activation of one or more events such as the playback of a track, the playback of an associated video to a track, or other such linking or activation. Additional navigations, similar to those described above, may be provided, and for simplicity are not shown the depiction of the GUI 500 of FIG. 9.

Figure 10:
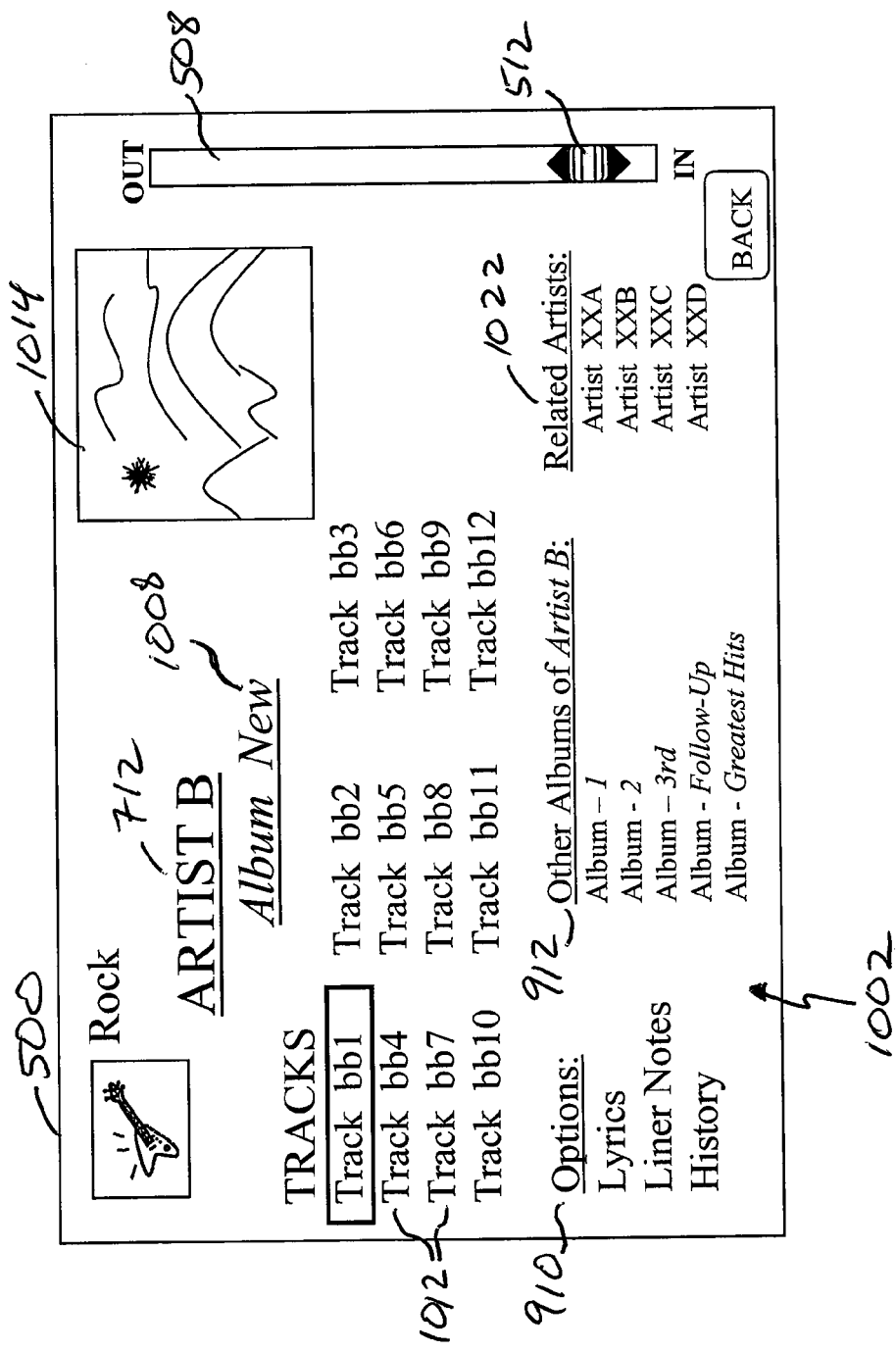
FIG. 10 depicts a simplified representation of the GUI showing content associated with an alternate album in a sixth state that is displayed upon selection of an identified other albums of FIG. 9.

FIG. 10 depicts a simplified representation of the GUI 500 at an alternate zoomed state 1002 showing content associated with an alternate album (e.g., "Album New") that is displayed, for example, upon a detection of a selection (e.g., a user using a mouse) of one of the identified "other albums" 920 of FIG. 9 associated with "Artist B." The sixth state 1002 of the content zoom in FIG. 10, in some applications, can be similar to the fifth content zoomed state 902 of FIG. 9 from which the transition to the alternate album content is implemented. Similar content is provided to the user such as, but not limited to, title of the album 1008, artist name 712, the name of the tracks 1012 (or portions of names of the track), album art 1014, additional options 910 associated with the album and/or tracks, such as access to lyrics, liner notes, history of the album and/or track and other such information, other albums 920 from the same artist (note that "Album B is now displayed in this listing), related artists 1022, related albums, and other such information. Further, the selection (e.g., selection of an alternate album "Album New") may be associated with a different genre (e.g., the "Rock" genre). The GUI 500 in the sixth state 1002 can additionally provide the zoom scroll bar 508 with the scroll indicator 512 designating a relative level of zoom. Additional navigations, similar to those described above, may be provided, and for simplicity are not shown the depiction of the GUI 500 of FIG. 10. Again, some or all of the content and/or graphics displayed in the GUI 500 can define links to other content and/or the activation of events.

Figure 11:
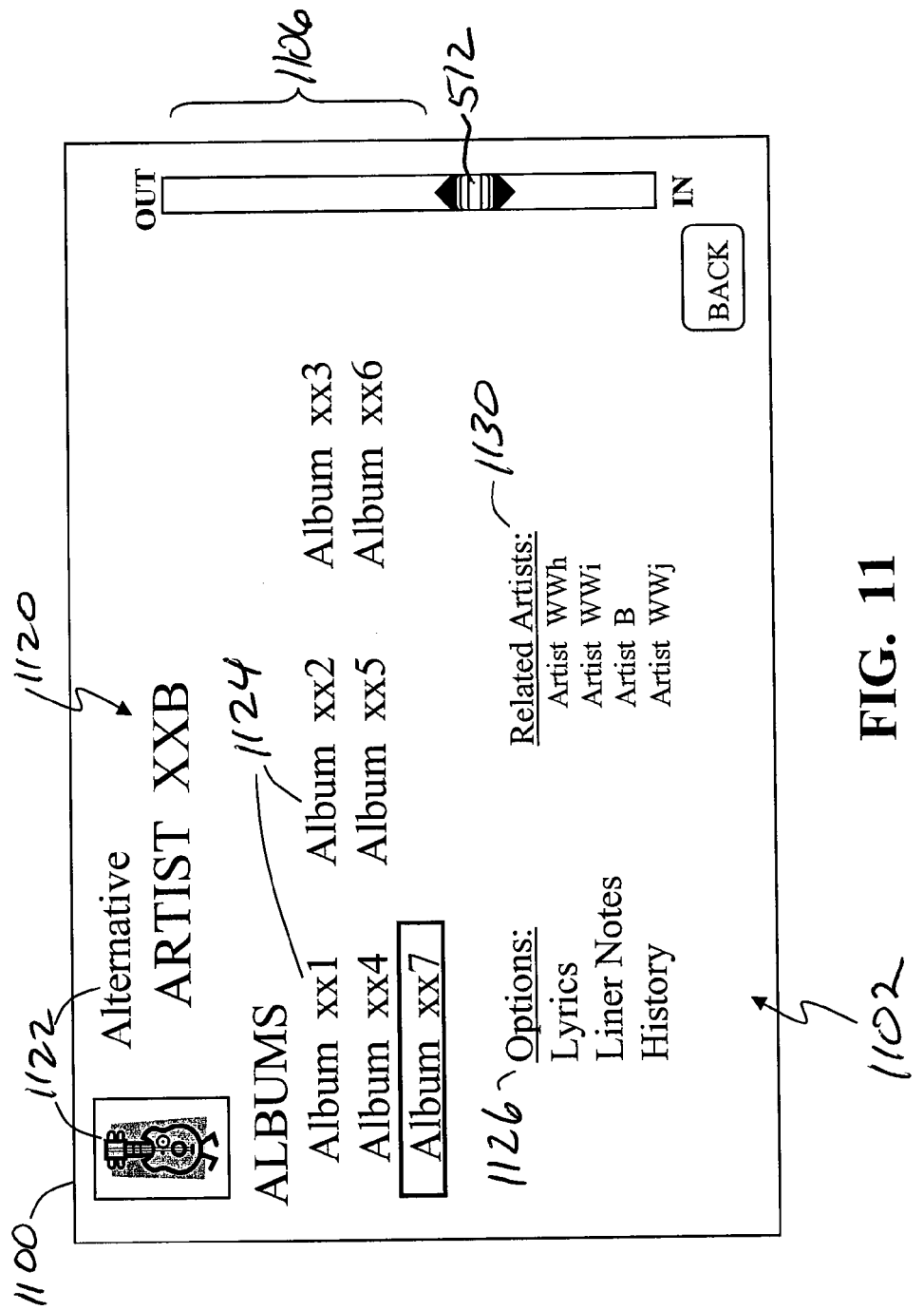

FIG. 11 depicts a simplified representation of the GUI 500 at a seventh state 1102 showing content associated with an alternate artist 1120 (e.g., Artist "XXB"), in a different genre 1122 (designated by the graphics and/or indicator, such as "Alternative") that is displayed upon a detection of a selection (e.g., a user selecting a key of a keyboard or using a mouse) of a related artist 922 from, for example, one of the fifth or sixth states of the GUI representations of FIG. 9 or 10, respectively. In some instances the level of zoom may shift, for example out (as indicated by the scroll indicator 512 and the distance 1106 relative to the full zoomed out state). The state of zoom can depend on the amount of information to be displayed relative to the content represented in the GUI 500. In this example, several albums 1124 are identified for the identified artist. Additional information when available can further be provided when space is available, such as but not limited to options 1126 (e.g., lyrics, liner notes, history, etc.), related artists 1130, and other such additional information. Additional navigations, similar to those described above, may additional be provided in some instances. For simplicity the depiction of the GUI 500 in the seventh content zoom state 1102 of FIG. 11 does not show many of the navigation options that may be provided. Similar transitions to other GUIs with alternative and/or related content can be accessed by selecting a link displayed in a GUI. Further, the navigation options allow navigation through the content to alternate content and associated information.

As described above, in many embodiments, the metadata associated with the representations of organizations of content, representations of content, additional content and/or information can in part dictate additional information, graphics, representations and the like that are displayed in subsequent zoom-ins or zoom-outs. The metadata can be prioritized upon storage to identify which additional information is to be displayed upon an implementation of a content zoom. Depending on a size of the subsequent GUI and the amount of zoom to be implemented, the amount of additional information and/or graphical representations to be displayed on the subsequent zoomed state can be based on the priority. In some instances, the priority can be directly associated with predefined levels of zoom. Additionally or alternatively, an amount of space within the GUI is identified, and based on the identified amount of space the metadata is evaluated and/or parsed to identify an amount of additional content and information associated with content represented by an icon or information of a preceding level of zoom that can be effectively displayed is identified in order of the priority. As described above, some of the information is truncated and/or only partially displayed, and in some instances an indication that the information is truncated is displayed. The priority and/or hierarchy of representations and information can be defined within the metadata, defined by a content provider, defined by the user and/or altered by the user. In some instances, tracking of use of content and/or metadata associated with content can aid in defining a priority of metadata. Additional outside sources can provide further information that allows the system 100 to adjust the priority of metadata. For example, as an album becomes more popular it may be given a higher priority based on a user access and/or based on a remote source identifying a rise or fall in popularity, or other such factors.

Figure 12:
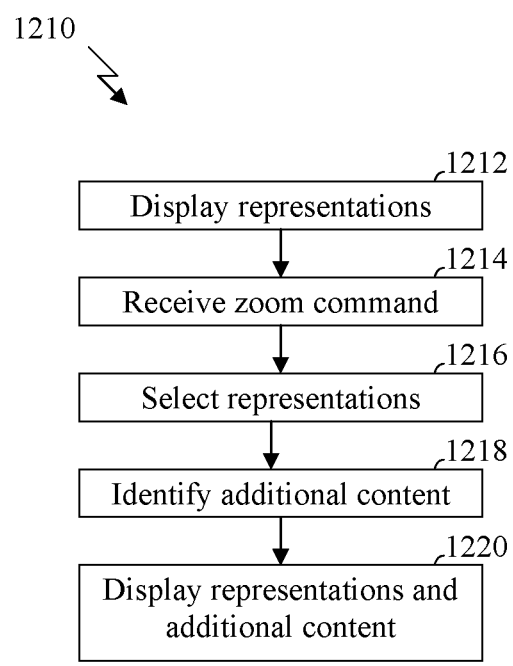
FIG. 12 depicts a simplified flow diagram of a process of implementing a content zoom according to some embodiments.

FIG. 12 depicts a simplified flow diagram of a process 1210 of implementing a content zoom according to some embodiments. In step 1212 a plurality of representations of content are displayed. These representations can be titles, icons, graphics, text, or other such representations and/or combinations of representations. In step 1214 a command to implement a content zoom is received and detected. As described above, the command may be based on a user selecting a link in the GUI 500, selecting a portion of the zoom scroll bar 508 or other such commands. In step 1216 one or more of the displayed representations of content are identified or selected. The identification can be based in part on one or more entities, icons, links or the like highlighted and/or selected through the GUI. In step 1218 metadata associated with each of the representations of content selected in step 1216 are evaluated and additional information and/or content associated with each of the selected representations are identified as defined in the metadata. In step 1220 a subsequent state of the GUI is generated and displayed to include further representations and/or additional content associated with the selected representations.

Figure 13:
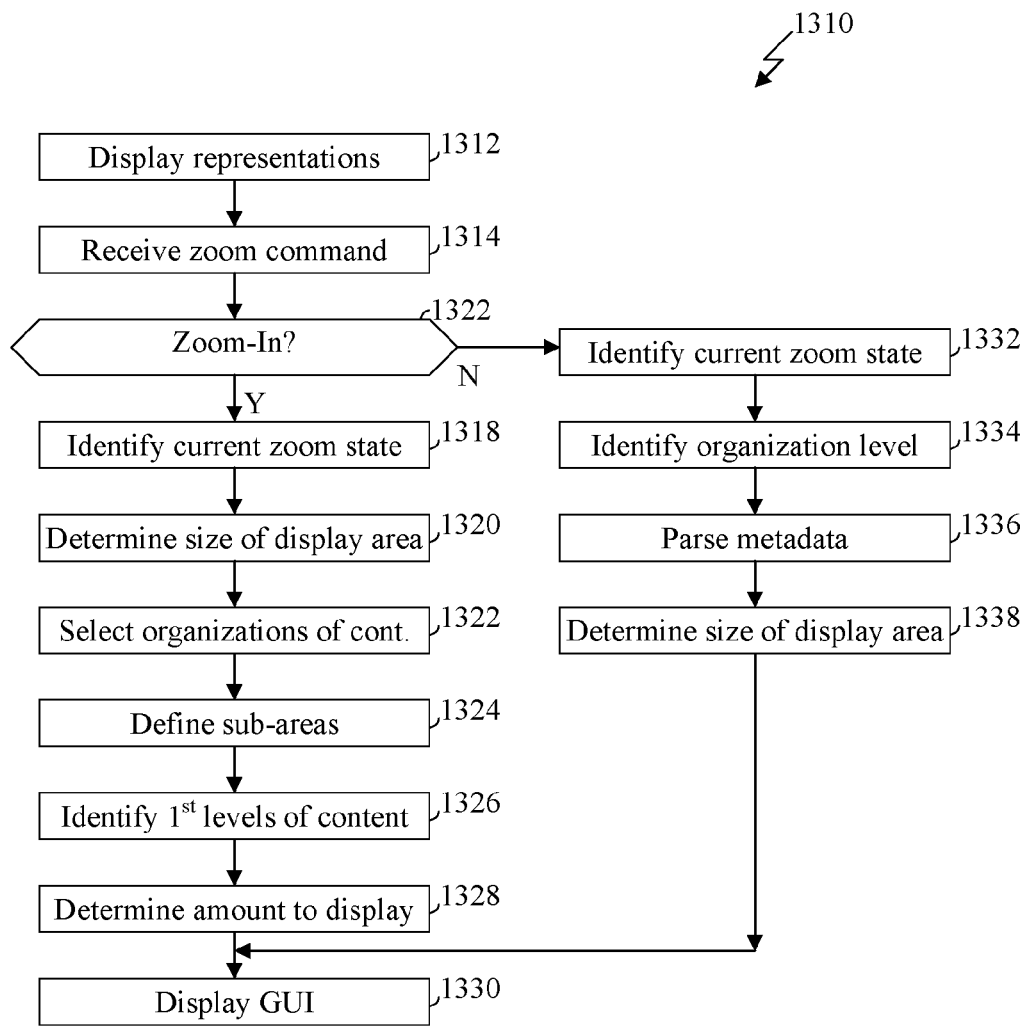
FIG. 13 depicts another process of implementing a content zoom according to some embodiments.

FIG. 13 depicts another process 1310 of implementing a content zoom according to some embodiments. In step 1312 a plurality of representations of different organizations, categories and/or associations of content are displayed through a GUI. The organizations and/or associations can be based on substantially any defined and/or desired organization, such as alphabetical, numerical, based on subject, name, name of creator, author or artist, date of creation or release, or other such organizations and/or combinations of organizations. In step 1314 a command to implement a first content zoom is received and detected at the processor 102. This command can be based on a detection of a movement or user initiated drag of the content zoom indicator 512 along the content zoom scroll bar 508, through the selection of a zoom button (e.g., zoom out 514 or zoom in 516), an indication of an area to be zoomed on (e.g., by a user extending a "zoom box"

allowing a user to designate an area within a GUI to be zoomed in on), or other such indications. The process 1310 continues to step 1316 to determine whether to perform a content zoom-in or a content zoom-out.

In those instances where it is determined to acquire more details or a zoom-in is to be performed the process continues to step 1318 where a current zoom state is identified and a subsequent zoom-in state is identified. The identification of the subsequent zoom-in state can depend on the previous state, a relative position of the scroll indicator 514 or where the indicator is moved to along a length of the content zoom scroll bar 508, the size of an area designated by a user and/or other such factors. In step 1320, a size of an area within the GUI where the content is to be displayed is identified. In step 1322, one or more organizations of content associated with displayed representations of the plurality of representations of the current content zoom state are selected to be further represented in the subsequent content zoomed state in response to the command to implement the content zoom, where the number of selected representations can in some instances be base at least in part on the size of the area within the GUI to display the content. In some embodiments, a subset or less than all of the representations are selected in step 1322. Further in some embodiments, the number of representations can depend on metadata associated with one or more, or each of the organizations of content associated with the displayed representations, priorities of content of the organizations, user selections, user preferences, size of the GUI, font sizes, other such factors and/or combinations of factors.

In step 1324, a total number of selected representative organizations of content to be displayed in a subsequent zoomed-in GUI is determined, the amount of display area identified in step 1310 within the GUI is then divided by a the total number of organizations to be represented in the subsequent zoomed-in state to define sub-areas, and one sub-area is designated for each of the selected organizations of content. The sub-areas do not have to be equal in size. The sizes can vary depending on many factors, such as the priority of content associated with a selected representation, an amount of additional content to be displayed associated with an organization of content, user preferences, other such factors and/or combinations of factors.

In step 1326, metadata directly associated with the selected one or more organizations the content are identified and evaluated to identify a first level of additional content (such as textual content) associated with the organizations of the content, where the additional content can be descriptive of a first level of detail of the organizations of content, provide links to additional or alternative content typically displayed through a subsequent state of the GUI, be representative of further additional content and the like, or combinations thereof. In step 1328, an amount of a first level of first additional content associated with the organizations of the content is determined that are to be displayable within the identified sub-areas such that at least a portion of each entity of the amount of the first level of additional content is displayed in the subsequent zoomed-in GUI. It is noted that the number of representations of the current content zoom state and/or the size of the sub-areas may not be determined until after evaluating the metadata of one, multiple or all of the organizations of content as the metadata and/or the additional content identified by the metadata can be factors is determining sizes of one or more of the sub-areas. Alternatively, each sub-area can be give equal amounts of area of the GUI and/or can vary is size based on other factors such as those described above. In step 1330, the GUI is displayed in a subsequent zoomed-in state that comprises indications or representations of the organizations of the content of the selected representations, and the first level of the addition content for each of the selected representations in response to the command to implement the content zoom. The representations of the organizations of content in the subsequent content zoomed-in state can be the same as those displayed in a prior content zoomed state or can be different (e.g., smaller, larger, more detailed, higher resolution, etc.).

In those instances where it is determined in step 1316 that a zoom-out is to be performed similar steps as those described for the zoom-in are preformed for the zoom-out. In some embodiments, in response to the determination that a zoom-out is to be implemented the process 1320 transitions to step 1332 where a current zoom state is identified and a subsequent zoom-out state is identified. In step 1334 an organization level associated with the subsequent zoom-out state is identified and additional representations of content and/or organizations of content to be displayed are identified. The organizational level can depend on the content being organized, the number of levels of organization, the size of the GUI 500, the amount of metadata and associated additional content or information, and other such factors. For example, with musical content, a main level of organization can identify the main or top most organizational structure or categories, such as genre, artist, album, song, era and the like; a subsequent zoomed-in level could be genre identifying for example, "alternative," "rock," "acoustic," and other such levels. As such, in implementing step 1334 while in a state showing music associated with an "alternative" organization could identify that the main organizational structure or state as the subsequent zoom state and identify representations of content relative to the main organizational state. Again, the organization and levels of organization can vary depending on many factors, such as a user's specific organization, user preferences, the type of content being organized, the amount of content organized, the size of the GUI, the amount of metadata and/or additional content, and other such factors or combinations of factors. For example, with photographic content one or more organizational levels could include date of creation, location of creation, subject of photograph, individuals captured in photograph and other such organization.

In step 1336 metadata associated with the organizational level is parsed to determine content to display. In step 1338, a size of an area within the GUI where the content is to be displayed is identified and an amount of the content to display is determined. In some instances, the step of 1338 may further define sub-areas within the identified area as described above. The process then skips to step 1330 to display the subsequent GUI.

In some instances, subsequent commands or instructions to implement zooms can again implement some or all of the above steps. For example, a subsequent command can be detected in step 1314 to implement a subsequent content zoom. One or more textual entities of the first level of content are selected in step 1322 in response to the command to implement the subsequent content zoom. Metadata associated with the selected entities are accessed and evaluated in step 1326 to identify a second level of textual content associated with the selected entities that are descriptive of a second level of detail of the organization of content. A subsequent zoomed GUI can then be displayed in step 1330 that comprises an indication of the selected one more entities of content and the second level of content associated with the selected entities in response to the command to implement the subsequent content zoom.

As described above, the representations and/or additional content presented in a zoomed-in state of the GUI 500 can include links or be designated as links to other content and/or to activate events. In some instances the additional content includes a plurality of entities or entries, such as entities of textual content (e.g., Artist name, album name, tracks, etc.). One or of these entities displayed in a GUI can be associated with one or more additional content, and can be selectable to link to a corresponding one or more of the additional content. In response to receiving a selection of one of the textual entities, an alternative content can be identified of the additional content directly associated with the selected one of the textual entities, and an alternative state of the GUI can be displayed comprising a representation of the alternative content directly associated with the selected one of the textual entities and further textual content descriptive of the alternative content. In some instances, when transitioning to the alternative content, the level of zoom or detail is maintained such that the alternative GUI has a zoom level that is the same as or similar to the zoom level of the immediately previous GUI from which the link was selected. This allows a user to maintain a level of information without having to re-negotiate through zoom levels of information and/or details. The content zoom provided through the present embodiments can be applied to substantially any organization of content, such as but not limited to, video content, audio content, audio-video content, graphical content, photographic content, textual content, word processor content, image content, content associated with products, marketing content, and other such content. Similarly, the metadata used in defining and/or associating content can include substantially any relevant association, categorization, listing, cooperation, definition and the like, and can include parameters and/or factors defined by the content or information, the content or information supplier, the source of the content or information, timing, user defined and the like.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. A method for use in navigating through content, the method comprising:
    displaying, in a first zoomed state, a plurality of representations of organizations of content;
    detecting a command to implement a first content zoom while displaying the plurality of representations of content, where the detecting the command to implement the first content zoom comprises detecting an indication specified by a user extending a zoom box over a displayed area to be zoomed in on;
    selecting, in response to the command to implement the first content zoom, a first organization of content associated with a displayed first representation of the plurality of representations, and selecting a second organization of content associated with a displayed second representation of the plurality of representations;
    identifying first metadata directly associated with the first organization of content and identifying second metadata directly associated with the second organization of content;
    evaluating the first metadata and identifying as defined in the first metadata a first level of first textual content associated with the first organization of content, where the first textual content is descriptive of a first level of detail of the first organization of content, wherein the identifying the first level of the first textual content comprises identifying a priority of metadata of the first metadata and identifying the first textual content as defined by a first priority;
    evaluating the second metadata and identifying as defined in the second metadata a first level of second textual content associated with the second organization of content, where the second textual content is descriptive of a first level of detail of the second organization of content, wherein the identifying the second level of the second textual content comprises identifying a priority of metadata of the second metadata and identifying the second textual content as defined by a second priority;
    displaying, in a second zoomed-in state, third and fourth representations of the first and second organizations of content, respectively, and the first level of the first and second textual contents in response to the command to implement the first content zoom;
    tracking use of the first and second metadata; and
    adjusting the first and second priority based on the tracking of the use of the first and second metadata,
    wherein the displaying the second zoomed-in state further comprises displaying a navigation menu separate from the plurality of representations of organizations of content displayed in the first zoomed state and the third and fourth representations of the first and second organizations of content displayed in the second zoomed-in state, wherein the displayed navigation menu comprises a plurality of icons representative of organizations of content in one or more previous zoomed out states including icons representative of the plurality of representations of organizations of content displayed in the first zoomed state, wherein the plurality of icons comprise links that are configured to cause, when selected by the user, a transition to an alternative organization of content corresponding to the selected icon.

2. The method of claim 1, wherein the displaying the plurality of representations of the organizations of content comprises displaying the plurality of representations of the organizations of content through a graphical user interface (GUI); and
    the displaying the third and fourth representations of the first and second organizations of content, respectively, and the displaying the first level of the first and second textual contents comprises displaying in the GUI the third and fourth representations of the first and second organizations of content, respectively, and the first level of the first and second textual contents.

3. The method of claim 2, further comprising:
    determining a first amount of area within the GUI that is available to display additional content associated with first organization of content; and
    where the evaluating of the first metadata comprises identifying additional content defined in the first metadata as being associated with the first organization of content, where the first level of first textual content comprises a plurality of textual entities representative of a plurality of content, and identifying the first level of first textual content associated with the first organization of the content from the additional content associated with the first organization of content that is displayable within the identified first amount of area such that at least a portion of each of the plurality of textual entities of the first level of first textual content is displayed in the GUI.

4. The method of claim 3, wherein the determining the first amount of area within the GUI that is available comprises:

identifying a number of other organizations of content including the second organization of content to be represented in the GUI by a corresponding number of representations of the number of other organizations of content and additional content associated with each of the other organizations of content;

identifying a second amount of area and defining sub-areas within the second amount of area by dividing the second amount of area by a sum of the first representation of the first organization of content plus the number of other representations of the other organizations of content including the second organization of content; and designating one of the sub-areas as the first area and each of the remaining one or more sub-areas being designated for one of the number of other organizations of content.

5. The method of claim 3, wherein the first textual content comprises a plurality of textual entities where each of the textual entities displayed in the GUI is representative of and associated with one or more additional content, and each textual entity is selectable such that when selected at least the representative one or more of the additional content is displayed.

6. The method of claim 5, further comprising:
receiving a selection of one of the textual entities;
identifying an alternative content of the additional content directly associated with the selected one of the textual entities;
displaying a representation of the alternative content directly associated with the selected one of the textual entities and further textual content descriptive of the alternative content.

7. The method of claim 6, wherein the displaying the representation of the alternative content directly associated with the selected one of the textual entities and the further textual content descriptive of the alternative content within third GUI comprises displaying the third GUI at the first level of detail.

8. The method of claim 2, further comprising:
detecting a command to implement a second content zoom subsequent to the command to implement the first content zoom;
selecting at least a first textual entity of the first level of first textual content in response to the command to implement the second content zoom;
identifying third metadata directly associated with the first textual entity;
evaluating the third metadata and identifying a second level of textual content associated with the first entity of the first textual content and descriptive of a second level of detail of the first organization of content; and
displaying a representation of the first textual entity of textual content, and the second level of textual content in response to the command to implement the second content zoom.

9. The method of claim 2, further comprising:
detecting a command to implement a second content zoom subsequent to the command to implement the first content zoom;
selecting at least first and second textual entities of the first level of first textual content in response to the command to implement the second content zoom;
identifying third metadata directly associated with the first textual entity;
identifying fourth metadata directly associated with the second textual entity;
evaluating the third metadata and identifying a second level of textual content associated with the first entity of the first textual content and descriptive of a second level of detail of the first organization of content and evaluating the fourth metadata and identifying a second level of textual content associated with the second entity of the first textual content and descriptive of the second level of detail of the first organization of content; and
displaying a representation of the first entity of textual content, a representation of the second entity of textual content and the second level of textual content associated with the first and second entities in response to the command to implement the second content zoom.

10. The method of claim 1, wherein the receiving the command to implement the first content zoom comprises detecting a user initiated drag of a scroll indicator on a content zoom scroll bar.

11. The method of claim 10, wherein the identifying the first level of textual content comprises identifying a relative position of the scroll indicator along a length of the content zoom scroll bar and identifying the first level as being associated with the identified relative position of the scroll indicator along the length of the content zoom scroll bar.

12. A method of displaying content, comprising:
displaying a first zoomed state comprising multiple representations of multiple categories of content corresponding to a first zoomed level of a plurality of zoom levels;
detecting a first instruction to implement a first content zoom, where the detecting the first instruction to implement the first content zoom comprises detecting an indication specified by a user extending a zoom box over a displayed area to be zoomed in on;
selecting, in response to the first instruction to implement the first content zoom, first and second categories of content, where each of the first and second categories is associated with first and second representations, respectively, of the multiple displayed representations that represent the first and second categories of content, respectively;
parsing a first metadata associated with first content of the first category and a second metadata associated with second content of the second category, and identifying from the first metadata a first amount of additional content identified within the first metadata that is descriptive of at least some of the first content of the first category and one or more additional representations of further zoomed in levels of organizations of content corresponding to the first category, and identifying from the second metadata a second amount of additional content identified within the second metadata that is descriptive of at least some of the second content of the second category and one or more additional representations of further zoomed in levels of organizations of content corresponding to the second category, where the identifying the first amount of the first content and the one or more additional representations of further zoomed in levels corresponding to the first category comprises identifying a priority of metadata of the first metadata and identifying the first amount of the first content and the one or more additional representations of further zoomed in levels corresponding to the first category as defined by a first priority, and where the identifying the second amount of the second content and the one or more additional representations of further zoomed in levels corresponding to the second category comprises identifying a priority of metadata of the second metadata and identifying the second amount of the second content and the one or more additional representations of further zoomed in levels corresponding to the second category as defined by a second priority;

displaying a second zoomed state comprising the first and second representations representative of the first and second categories of content, respectively, and the corresponding first and second amounts of additional content in response to the first instruction to implement the first content zoom, where less than all of the multiple representations of multiple categories of content are displayed, where the displaying the first amount of additional content comprises displaying the one or more additional representations of the further zoomed in levels of organizations of content that are associated with the first category of content, and the displaying the second amount of additional content comprises displaying the one or more additional representations of the further zoomed in levels of organizations of content that are associated with the second category of content;

tracking use of the first and second metadata; and adjusting the first and second priority based on the tracking of the use of the first and second metadata, wherein the displaying the second zoomed state further comprises displaying a navigation menu separate from the multiple representations of multiple categories of content displayed in the first zoomed state and the first and second representations displayed in the second zoomed state, wherein the displayed navigation menu comprises a plurality of icons representative of organizations of content in one or more previous zoomed out states including icons representative of the multiple categories of content displayed in the first zoomed state, wherein the plurality of icons comprise links that are configured to cause, when selected by the user, a transition to an alternative organization of content corresponding to the selected icon.

13. The method of claim 12, further comprising:

detecting a second instruction to implement a second content zoom;

selecting the first representation representative of the first category of content, in response to the second instruction to implement the second content zoom;

parsing the first metadata associated with the first content of the first category, and identifying from the first metadata a second amount of additional content that is not part of the first amount of additional content that is descriptive of at least a first entity of the first amount of additional content; and displaying a third zoomed state comprising a third representation of the first category, the first entity of the first additional content and the second amount of additional content.

14. The method of claim 13, further comprising:

detecting a selection of a representation of multimedia content of the first content where the representation is part of the second amount of additional content;

causing to be played back the multimedia content of the first content in response to the detection of the selection of the representation of the portion of the first content.

15. A system allowing access to content, the system comprising:

a computer readable medium that stores content in a digital format and one or more computer programs;

a display; and a processor coupled with the display and the computer readable medium, where the processor is configured to execute the one or more computer programs to:

access a least some of the content from the computer readable medium;

communicate with the display to display a first zoomed state comprising representations of the at least some of the content;

detect a first instruction to implement a content zoom, where the detecting the first instruction to implement the content zoom comprises detecting an indication specified by a user extending a zoom box over a displayed area to be zoomed in on;

select a plurality of the displayed representations in response to the first instruction to implement the content zoom;

parse a plurality of metadata with each of the plurality of metadata associated with one of the pluralities of the selected representations and selecting from each of the plurality of metadata a first amount of additional content descriptive of content associated with a corresponding one of the selected representations of content and one or more additional representations of content corresponding to the one of the pluralities of selected representations, wherein the identifying the first amount of additional content and one or more additional representations of content comprises identifying a priority of metadata of each of the plurality of metadata and identifying the first amount of additional content and one or more additional representations of content as defined by each priority of the plurality of metadata;

communicate with the display to display a second zoomed state comprising the selected plurality of representations, each of the corresponding first amounts of additional content and the one or more additional representations of content corresponding to the one of the pluralities of selected representations in response to the first instruction to implement the content zoom, wherein the displayed second zoomed state further comprises a navigation menu separate from the displayed representations of the at least some of the content and the selected plurality of representations, wherein the displayed navigation menu comprises a plurality of icons representative of organizations of content in one or more previous zoomed out states including icons identifying the displayed representations of the at least some of the content displayed in the first zoomed state, wherein the plurality of icons comprise links that are configured to cause, when selected by the user, a transition to an alternative organization of content corresponding to the selected icon;

tracking use of the priority of each of the plurality of metadata; and adjusting the priority based on the tracking of the use of each of the plurality of metadata.

16. The system of claim 15, wherein the first additional content comprises a link to activate playback of media content.

17. The system of claim 16, wherein the one or more additional representations of content comprises a graphical representation of the media content.

18. The system of claim 17, wherein the processor is further configured to parse a least a first metadata of the plurality of metadata and identify an identification of related content that is related to an entry of the first amount of the additional content descriptive of the content associated with the corresponding one of the selected representations of content where the related content is not descriptive of the content associated with the corresponding one of the selected representations of content and is descriptive of the related content, and to display the identification of the related content with the selected plurality of representations and each of the corresponding first amounts of additional content in response to the first instruction to implement the content zoom.

19. The method of claim 12, wherein the one or more additional representations of the further zoomed in levels of organizations of content that are associated with the first category of content are not displayed in the first zoomed state, and wherein the one or more additional representations of the further zoomed in levels of organizations of content that are associated with the second category of content are not displayed in the first zoomed state.

\* \* \* \* \*